(12) United States Patent
Morise

(10) Patent No.: US 7,118,059 B2
(45) Date of Patent: Oct. 10, 2006

(54) REEL UNIT FOR SPINNING REEL

(75) Inventor: Taisei Morise, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/755,406

(22) Filed: Jan. 13, 2004

(65) Prior Publication Data
US 2004/0232265 A1    Nov. 25, 2004

(30) Foreign Application Priority Data
Jan. 29, 2003  (JP) ............................ 2003-020764
Jan. 29, 2003  (JP) ............................ 2003-020765
Jan. 29, 2003  (JP) ............................ 2003-020766

(51) Int. Cl.
*A01K 89/01* (2006.01)

(52) U.S. Cl. ..................... 242/311; D22/140

(58) Field of Classification Search ........ 242/310–315; D22/140–141
See application file for complete search history.

(56) References Cited

U.S. PATENT DOCUMENTS 4,180,217 A * 12/1979 Harre et al. ................ 242/239
5,350,130 A *  9/1994 Hitomi et al. ............... 242/241
5,443,571 A *  8/1995 Kang .......................... 242/311
5,540,397 A *  7/1996 Yoshikawa .................. 242/311
5,934,586 A *  8/1999 Kang et al. .................. 242/241
6,102,317 A *  8/2000 Bernard et al. ............. 242/319
6,857,588 B1 * 2/2005 Chang ........................ 242/311

FOREIGN PATENT DOCUMENTS

JP         10-004836 A     1/1998

\* cited by examiner

*Primary Examiner*—Emmanuel M Marcelo
(74) *Attorney, Agent, or Firm*—Global IP Counselors, LLP

(57) ABSTRACT

A spinning-reel reel unit includes a rod-attachment leg and a reel body having a main piece and a lid member. The lid member is integrally formed with the rod-attachment leg and is attachably/detachably fitted to the main piece. The main piece and the lid member are shaped so that a joint forms a curved seam on the rod-attachment leg side. The joint is formed so as to bulge downward on a side of the main piece away from the rod-attachment leg. The joint is formed so as to be tilted upward on the rod-attachment leg aside toward the front. In the spinning-reel reel unit, the overall size of the reel is reduced while the strength of the reel unit is kept high.

18 Claims, 11 Drawing Sheets

REEL UNIT FOR SPINNING REEL

BACKGROUND OF THE INVENTION

1. Field of the Invention

The present invention relates to reel units. More specifically, the present invention relates to spinning-reel reel units from which fishing line can be reeled out frontward.

2. Background Information

A spinning reel generally has a reel unit mounted to a fishing rod, a handle rotatably attached to the reel unit, a rotor rotatably fitted to the reel unit, and a spool fitted to the front of the rotor reciprocatably relative to the reel unit. Fishing line is guided by the rotor and is wound around the outer circumference of the spool.

The reel unit is furnished with a T-shaped rod-attachment leg to be fitted to a fishing rod, and a reel body that is formed integrally with the rod-attachment leg and is for accommodating a variety of mechanisms inside. The reel body includes a main piece having a housing space inside that opens sideways, and a lid member fitted to the main piece attachably/detachably covering the opening of the main piece. The opening of the main piece is formed in a substantially rectangular shape along the contour of the main piece so that the joint between the main piece and the lid member is exposed on the rod-attachment leg side in the shape of a liner line, as seen, for example, in Japanese Patent Application Publication. No 10-4836.

In the foregoing conventional spinning reel, the joint between the main piece and the lid member that is exposed on the rod-attachment leg side is formed so as to shape a liner line. However, such structure tends to create a wasteful space between the joint and the contour of the main piece. Such a wasteful space created in the main piece may prevent reduction in the overall reel size, and cause the strength of the reel unit to degrade.

In addition, in the conventional configuration, the joint was formed to shape a liner line substantially parallel to the spool shaft. For this reason, in cases where a force acts on to the reel unit in the axial direction of the spool shaft, the cross-sectional area of the rod-attachment leg with respect to the load direction decreases abruptly at the joint portion. Accordingly, there is a risk of breakage at the joint portion if the material strength or the thickness of the reel unit is insufficient.

In view of the above, it will be apparent to those skilled in the art from this disclosure that there exists a need for an improved reel units that overcome the above-describe problem of the conventional art. This invention addresses this need in the art as well as other needs, which will become apparent to those skilled in the art from this disclosure.

SUMMARY OF THE INVENTION

It is an object of the invention to reduce the overall size of the reel and keep the strength of the reel unit high.

A spinning-reel reel unit according to the first aspect of the present invention is a spinning-reel reel unit adapted to be mounted onto a fishing rod and from which fishing line can be reeled out frontward. The reel unit includes a rod-attachment leg portion adapted to be mounted onto the fishing rod; and a reel body at which the rod-attachment leg portion is arranged. The reel body includes a main piece having a housing space and an opening through which the housing space is open, and a lid member detachably/reattachably fitted to the main piece so as to cover the opening in the main piece. The reel body is shaped so that a joint between the main piece and the lid member forms a curved seam on a side of the main piece closer to the rod-attachment leg portion.

The reel body in this reel unit is shaped so that the joint between the main piece and the lid member forms a curved seam on the rod-attachment leg portion side. Here, for example, by forming the reel unit having a joint that forms a curved seam following the contour of the main piece, a wasteful space between the joint of the main piece and the contour of the reel body is eliminated. Eliminating such a wasteful space thus makes it possible to reduce the overall size of the reel, while keeping the strength of the reel unit high.

A spinning-reel reel unit according to the second aspect of the present invention is a spinning-reel reel unit as set forth in the first aspect, wherein the joint is formed so as to bulge downward on a side away from the rod-attachment leg portion. In this case, since the joint is formed so as to bulge downward on a side away from the rod-attachment leg portion, the wasteful space between the joint of the main piece and the contour of the reel body can be eliminated to a relatively large degree. Moreover, if the joint is bulged downward to shape a gentle curve following the contour of the reel body, its design can be further improved.

A spinning-reel reel unit according to the third aspect of the present invention is a spinning-reel reel unit as set forth in the first or second aspect, wherein the joint is tilted upward on the rod-attachment leg portion side toward the front side. In this case, because the joint is formed so as to be tilted upward on the rod-attachment leg portion side toward the front, the joint is easily made into a shape that follows the contour of the reel body.

A spinning-reel reel unit according to the fourth aspect of the present invention is a spinning-reel reel unit as set forth in any one of the first through third aspects, wherein the rod-attachment leg portion is formed integrally with the main piece as a one-piece unitary unit. In this case, since the rod-attachment leg portion is formed integrally with the main piece, the configuration of the lid member can be simplified.

A spinning-reel reel unit according to the fifth aspect of the present invention is a spinning-reel reel unit as set forth in any one of the first through third aspects, wherein the rod-attachment leg portion is formed integrally with the lid member as a one-piece unitary unit. In this case, since the rod-attachment leg portion is formed integrally with the lid member, the main piece can be made from only a thin-walled portion, without having to mix thick-walled portions and thin-walled portions. This allows precise configuration of the main piece. In the mean time, the rod-attachment leg portion can be made from a thick-walled portion. This allows the rod-attachment leg portion to maintain high structural strength.

A spinning-reel reel unit according to the sixth aspect of the present invention is a spinning-reel reel unit as set forth in any one of the first through fifth aspects, wherein the lid member is made of a metal, and the lid member and the main piece are fastened with a screw at a peripheral edge portion of the main piece.

A spinning-reel reel unit according to the seventh aspect of the present invention is a spinning-reel reel unit as set forth in any one of the first through sixth aspects, wherein the main piece is made of a synthetic resin, and the lid member and the main piece are fastened with a tapping screw at a portion of the main piece other than the peripheral edge portion, the tapping screw being inserted through the lid-member the screw being inserted through the main piece.

In this case, the lid member is screw-fastened with a screw that is inserted through the main-piece at the peripheral edge portion of the main piece into a female screw portion formed in the lid member. The lid member is also screw-fastened with a tapping screw that is inserted through the lid-member into a part of the main piece other than the peripheral edge portion. Herein, the fact that the lid member is screw-fastened with a screw at the peripheral edge portion of the main piece means that the fitting strength can be kept high even when the length of the female screw portion that is formed in the lid portion to receive the screw is shorter than the length of the portion of the main piece that receives the tapping screw. In addition, the lid member is fastened with a tapping screw in a part of the main piece other than the peripheral edge portion, and therefore, the fitting of the lid member is easy.

A spinning-reel reel unit according to the eighth aspect of the present invention is a spinning-reel reel unit as set forth in any one of the first through seventh aspects, wherein the main piece is formed in a rearwardly tapered shape. In this case, even when the rear of the main piece is formed in a tapered shape, the fitting strength can be maintained high.

A spinning-reel reel unit according to the ninth aspect of the present invention is a spinning-reel reel unit as set forth in any one of the first through eight aspects, further including a cover member covering at least either one of the rod-attachment leg portion and the reel body from rear. In this case, by fitting the cover member to the rod-attachment leg portion or the reel body, these components can be prevented from getting scratched, and the strength is maintained high.

A spinning-reel reel unit according to the tenth aspect of the present invention is a spinning-reel reel unit as set forth in the seventh aspect, further including a cover member that covers at least one of the screw and the tapping screw. In this case, the number of the screws exposed on the surface of the reel unit is reduced, and consequently, the appearance of the reel is improved.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
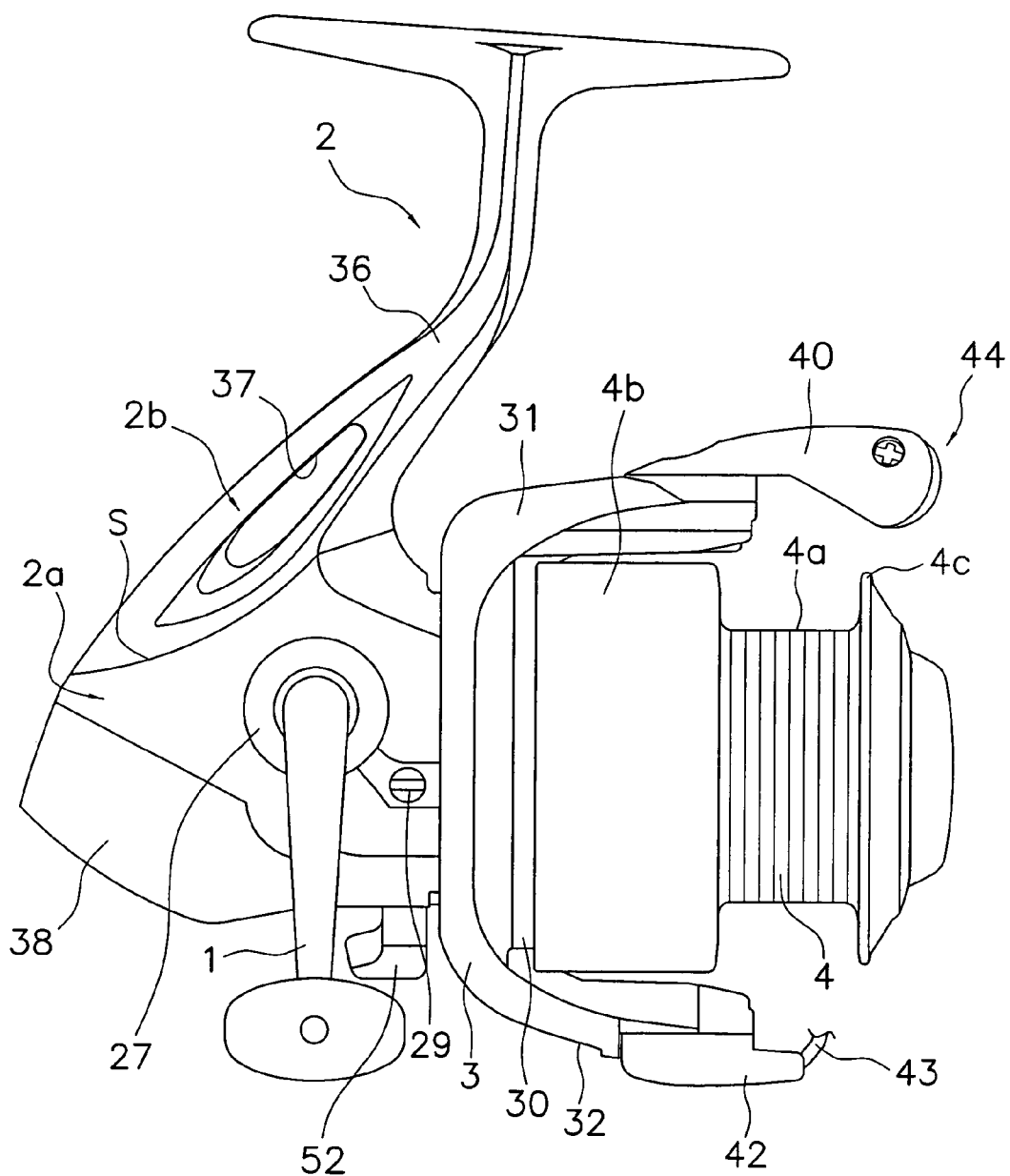
FIG. 1 is a right side view of a spinning reel in accordance with an embodiment of the present invention.
Figure 2:
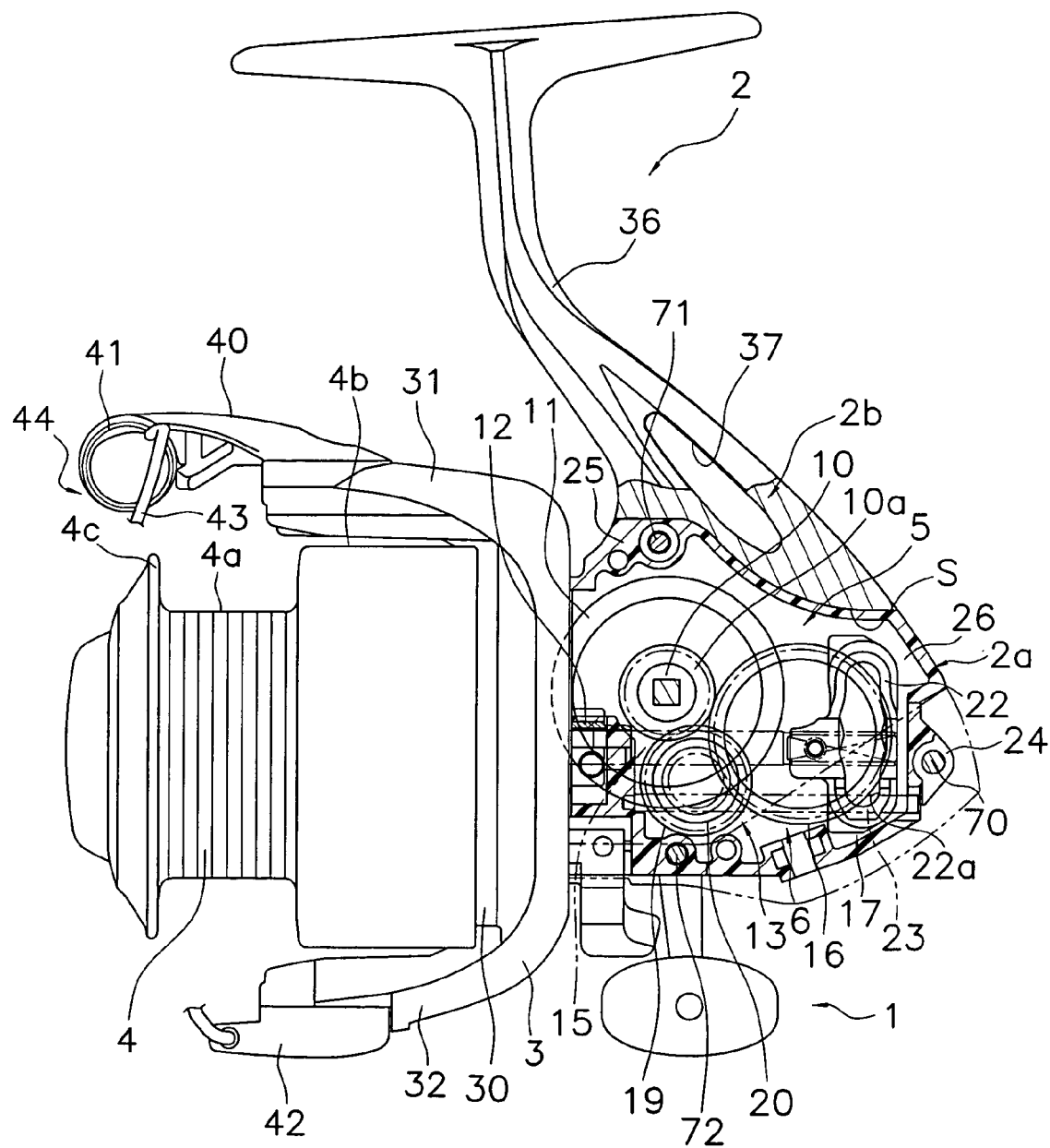
FIG. 2 is a left side cross-sectional view of the spinning reel in accordance with the embodiment of the present invention.

As shown in FIGS. 1 and 2, a spinning reel in accordance with an embodiment of the present invention includes a reel unit 2 to be mounted to a fishing rod, a rotor 3, a spool 4, and a handle 1 that is rotatably supported by the reel unit 2. The rotor 3 is for winding fishing line around the spool 4, and is arranged rotatably at the front of the reel unit 2. The spool 4 is for winding fishing line around the outer peripheral surface thereof, and is arranged at the front of the rotor 3 so that it can pump back and forth. The handle 1 is mounted on the left of the reel unit 2, as shown in FIGS. 1 and 2, but it can also be mounted on the right of the reel unit 2.

The reel unit 2 includes, as shown in FIGS. 2 to 5, a main piece 2a for supporting the rotor 3 and the spool 4, and a lid member 2b fitted detachably/reattachably to the main piece 2a and is integrally formed with a later-described rod-attachment leg portion 36 as a one-piece unitary unit. The main piece 2a and the lid member 2b are formed to have a tapered shape toward the rear. In the following description, the rear direction is the right hand direction, and the forward direction is the left hand direction as seen in FIG. 2. Similarly, the upward direction is the upward direction, and the downward direction is the downward direction as seen in FIG. 2. Fitted on lower rear portions of the rear of the main piece 2a and the lid member 2b is a cover member 38, attached from the rear.

Figure 4:
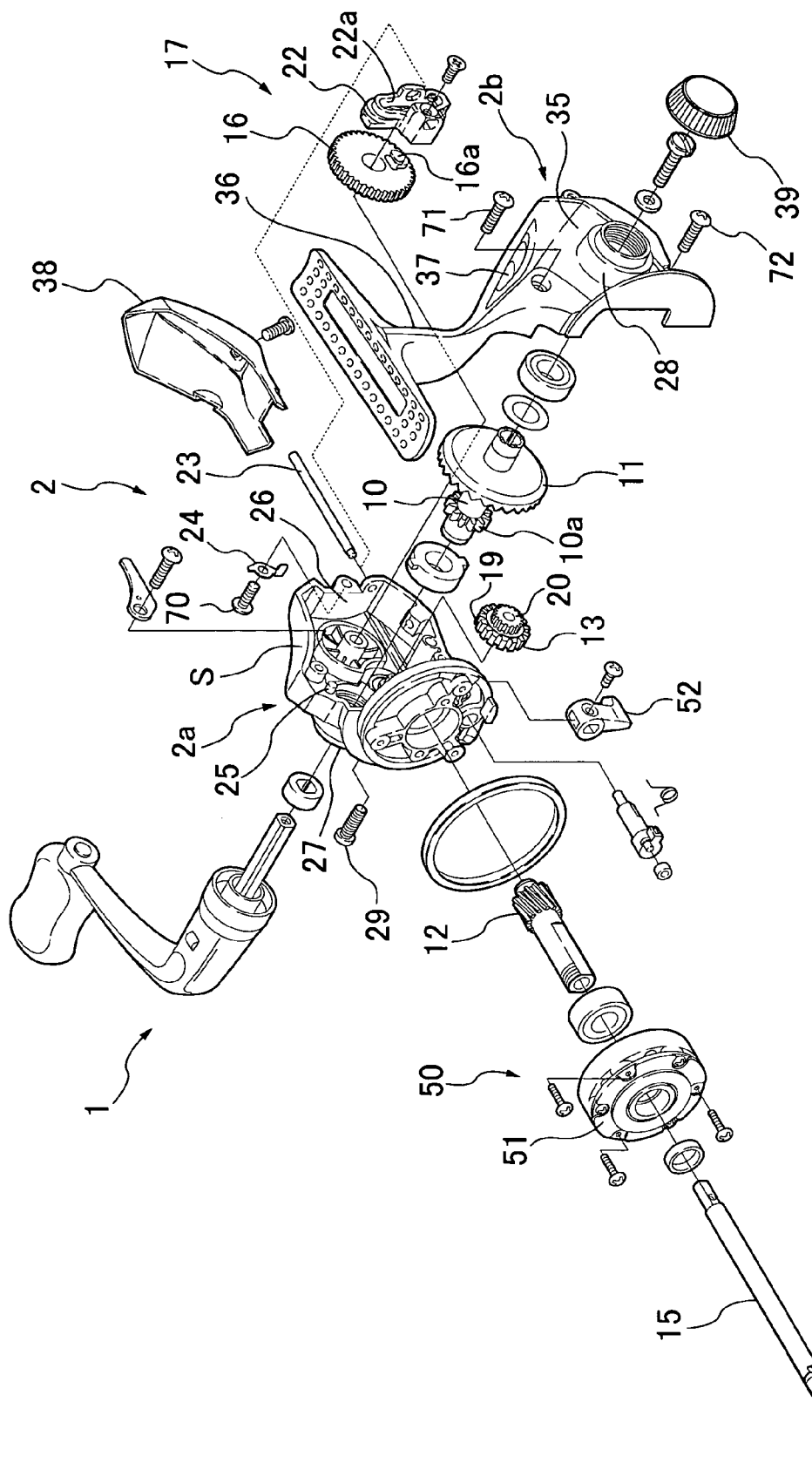
FIG. 4 is an exploded oblique view of a reel unit in accordance with the embodiment of the present invention.

As shown in FIGS. 2 and 4, the main piece 2a is a member that is made of a synthetic resin and is provided with an opening 25 on its side, and it has a housing space 26 formed inside. Provided in the housing space 26 are, as shown in FIG. 2, a rotor drive mechanism 5 for rotating the rotor 3, and an oscillating mechanism 6 for shifting the spool 4 back and forth to wind the fishing line uniformly.

Formed on a side of the main piece 2a is a first handle supporting unit 27 for supporting the handle 1. Below the first handle supporting unit 27, as shown in FIG. 1 and 4, a bolt member 29 is fitted to plug a hole for maintenance, such as lubrication and water draining. As shown in FIGS. 1 and 2, an operating lever 52 for a later-described anti-reverse mechanism 50 is mounted on a lower part of the main piece 2a.

The lid member 2b is made of a metal such as an aluminum alloy or a magnesium alloy, and as shown in FIGS. 1 to 5, includes a cover portion 35 and a rod-attachment leg portion 36. The rod-attachment leg portion 36 is formed integrally with the cover portion 35 as a one-pie unitary unit, and extends upward from the cover portion 35.

Figure 3:
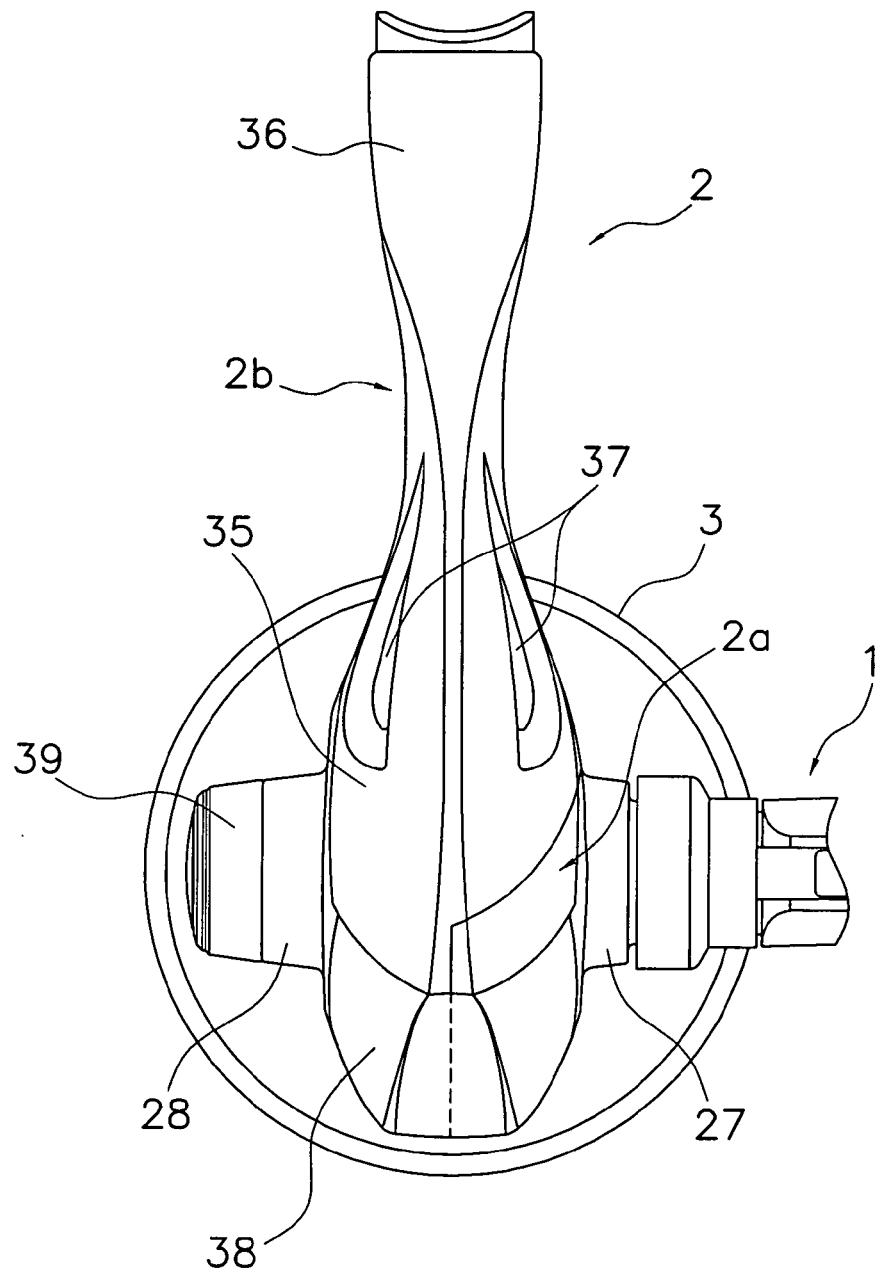
FIG. 3 is a rear view of the spinning reel in accordance with the embodiment of the present invention.
Figure 5:
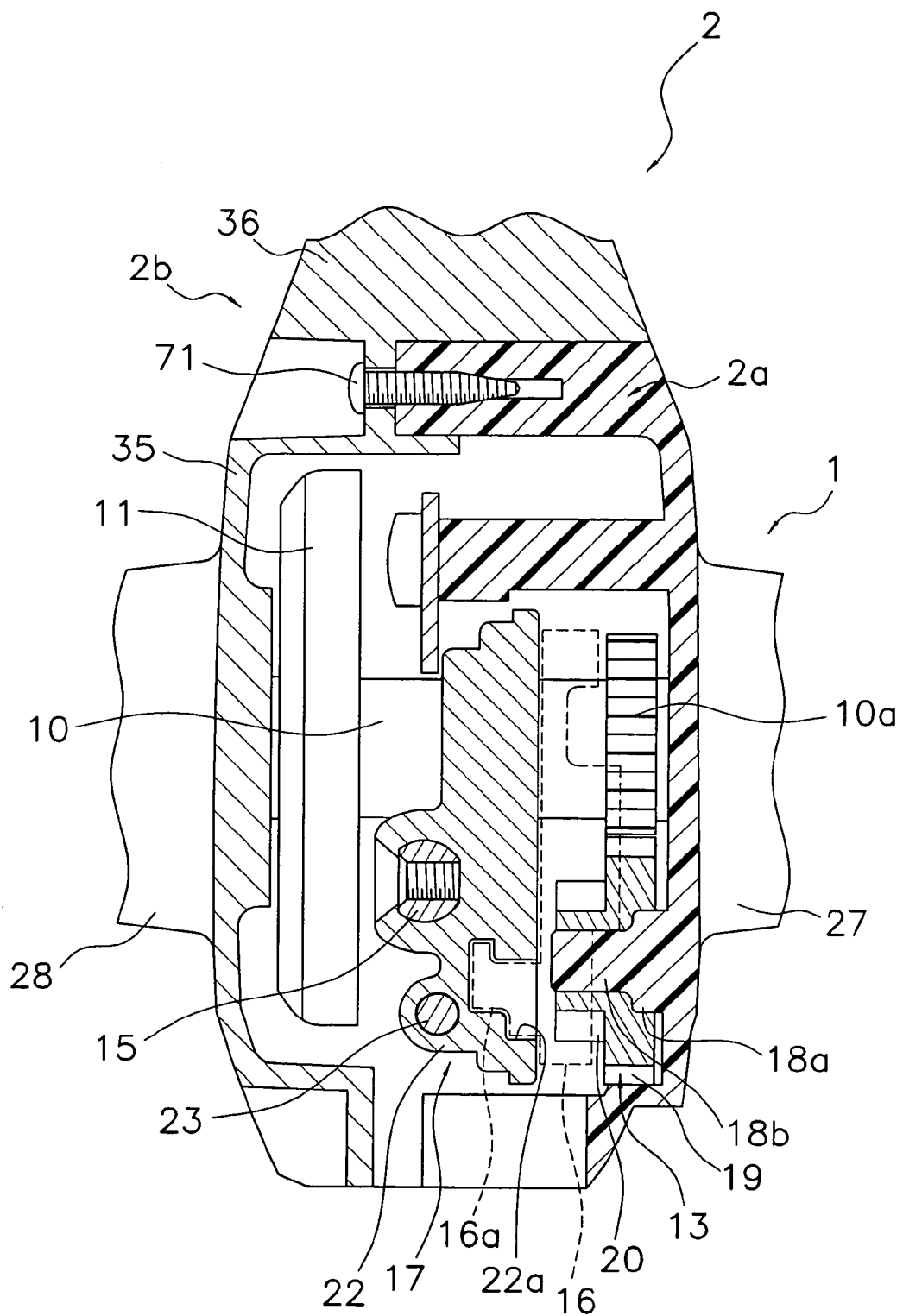
FIG. 5 is a cross-sectional rear view of the spinning reel in accordance with the embodiment of the present invention.

The cover portion 35 is, as shown in FIGS. 3 to 5, a member for closing the opening 25 of the main piece 2a such that the housing space 26 is left inside. One side of the cover portion 35 has a second handle supporting unit 28 formed thereon for supporting the handle 1. In the present embodiment the handle 1 is mounted to the first handle supporting unit 27, so a handle cap 39 is fitted to the second handle supporting unit 28 in place of the handle 1, as shown in FIGS. 3 and 4.

The rod-attachment leg portion 36 is, as shown in FIGS. 1 to 4, a substantially T-shaped solid, thick-walled member. The fore-end portion of the rod-attachment leg portion 36 extends toward both the front and the rear so that a fishing rod, which is not shown in the drawings, can be mounted thereon. A bulging mid portion of the rod-attachment leg portion 36 has a through hole 37 piercing sideways therethrough for reducing the weight and also improving the design. The through hole 37 is an oblong stepped hole formed in a lower portion of the rod-attachment leg portion 36 longitudinally along the contour of the rod-attachment leg portion 36.

The cover member 38 is a member having a substantially U-shaped cross-sectional shape, formed by plating a synthetic resin such as an ABS resin or using a stainless alloy so that it cannot be easily scratched.

The main piece 2a and the lid member 2b are, as shown in FIGS. 1, 2 and 4, formed so that a joint S forms a curved seam on a side closer to the rod-attachment leg portion 36. The joint S is formed so as to bulge downward on a side away from the rod-attachment leg portion 36. The joint S is also tilted upward on the rod-attachment leg portion 36 side toward the front side, that is, tilted upward toward the front.

The main piece 2a and the lid member 2b are, as shown in FIGS. 2 and 4, fastened with a screw 70 to each other in the rear portion, which is an example of peripheral edge portion of the main piece 2a. The screw 70 is inserted through the main piece 2a. The main piece 2a and the lid member 2b are also screw-fastened at an upper part and a lower part of the main piece 2a with respective tapping screws 71 and 72, which are inserted through the lid member 2b.

Figure 9:
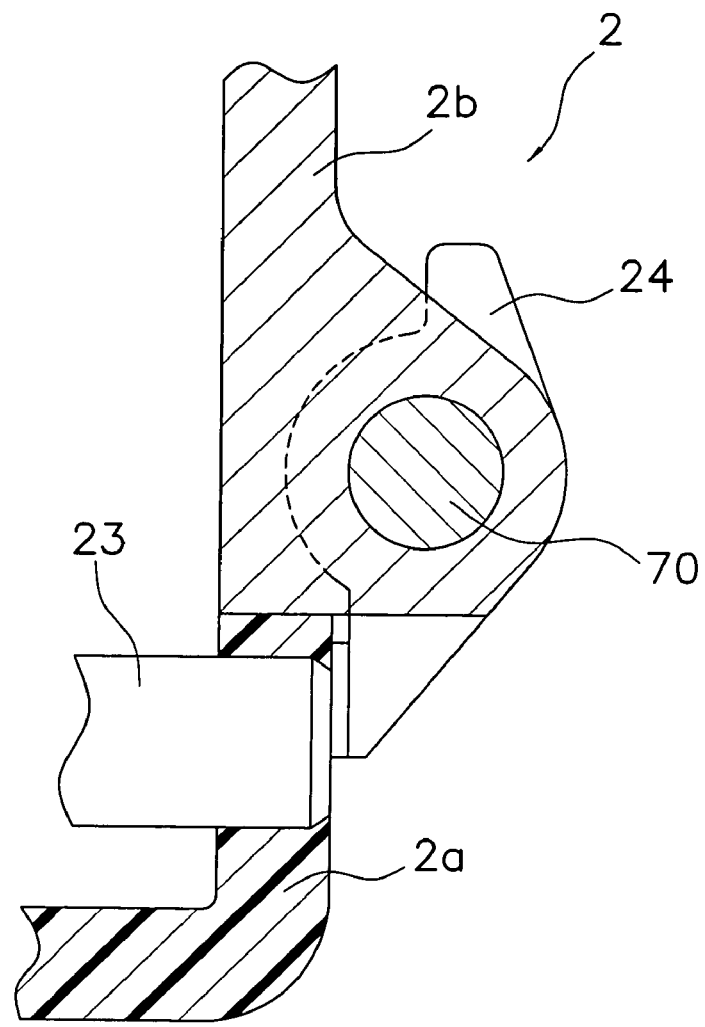
FIG. 9 is an enlarged side view of a screw portion in accordance with the embodiment of the present invention.

The screw 70 is, as shown enlarged in FIG. 9, screw-fastened into a female screw (not shown in the drawings) formed in a hole of the main piece 2a together with a retainer member 24 for retaining a later-described guide shaft 23. The retainer member 24 can pivot around the axis of the screw 70 intersecting the guide shaft 23, and by pivoting the retainer member 24, the guide shaft 23 can be either retained or released. Herein, because the retainer member 24 is fitted by the screw 70, it is unnecessary to provide an additional fastening screw or a hole formed along the direction of mounting the guide shaft 23 for fastening the retainer member 24, which were necessary conventionally.

Figure 10:
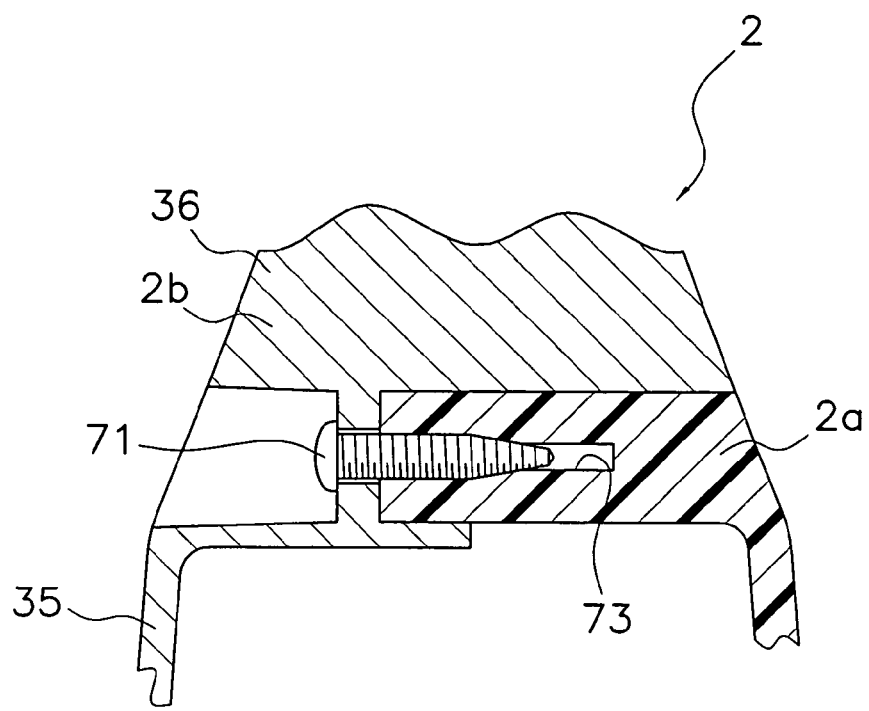
FIG. 10 is an enlarged cross-sectional view of a tapping screw in accordance with the embodiment of the present invention.

The tapping screw 71 is, as shown enlarged in FIG. 10, a relatively long screw that is formed in a slightly tapered shape. The tapping screw 71 is fixedly screwed into a tapping hole 73 from the metal-made main piece 2a side. The tapping hole 73 has a slightly smaller diameter than that of the tapping screw 71 and is formed in the main piece 2a made of a synthetic resin. The structure of screw-fastening of the tapping screw 72 is the same as that of the tapping screw 71 and will not be elaborated on further. As seen in FIG. 4, the screw 70 and the tapping screws 71 and 72 extend in opposite direction.

As shown in FIGS. 1 and 2, the rotor 3 has a cylindrical portion 30, and first and second rotor arms 31 and 32 disposed opposite one another at sides of the cylindrical portion 30. The cylindrical portion 30 and the first and second rotor arms 31 and 32 are formed integrally. A front portion of the cylindrical portion 30 is furnished with a wall having a through hole (not shown in the drawings), through which a pinion gear 12 and a spool shaft 15 pass through, as shown in FIG. 2.

Figure 11:
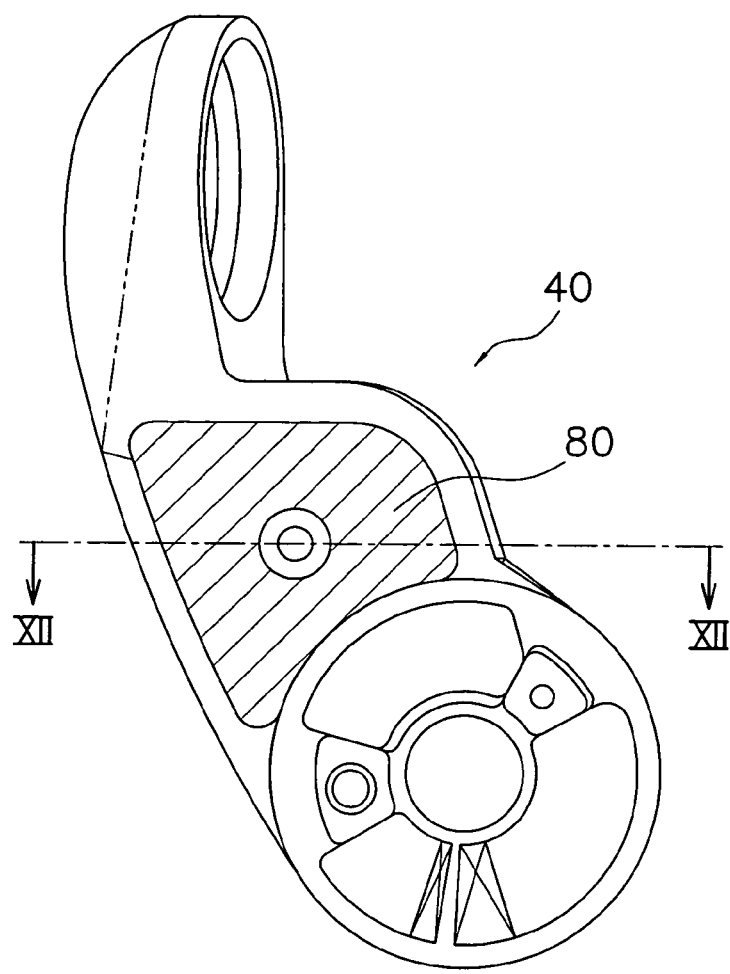
FIG. 11 is an enlarged bottom view of a first bail-support member in accordance with the embodiment of the present invention.
Figure 12:
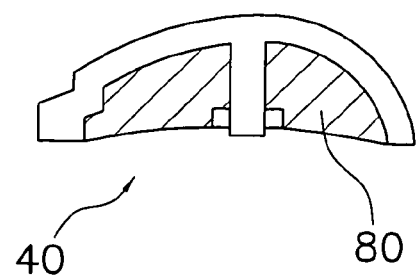
FIG. 12 is a cross-sectional view of the first bail-support member in accordance with the embodiment of the present invention, taken along line XII—XII in FIG. 11.

As shown in FIGS. 1 and 2, a first bail-support member 40 is fitted pivotably on the outer peripheral side of the fore end of the first rotor arm 31. To the fore end of the first bail-support member 40, a line roller 41 is fitted for guiding fishing line onto the spool 4, as shown in FIG. 2. On the outer peripheral side of the fore end of the second rotor arm 32, a second bail-support member 42 is fitted pivotally. A bail 43 is provided in between the second bail-support member 42 and the line roller 41, which is fitted to the fore end of the first bail-support member 40. These first bail-support member 40, the second bail-support member 42, the line roller 41, and the bail 43 together constitute a bail arm 44. As shown in FIGS. 11 and 12, a balancer member 80 is mounted inside the first bail-support member 40. The balancer member 80 is a weight member made of a metal such as a zinc alloy. The first bail-support member 40 made of a synthetic resin, with the balancer member 80 being mounted, has a shape and weight that are equivalent to those of conventional first bail-support members made of a metal such as an aluminum alloy. For this reason, even when the first bail-support member 40 is made of a synthetic resin, which is relatively light in weight, provision of such a balancer member 80 makes it possible to adopt the same design and configuration as those of the conventional first bail-support member made of a metal, such as an aluminum alloy, and thus, manufacturing cost can be reduced. The rotors are conventional components that are well known in the art. Therefore, their structures will not be discussed or illustrated in detail herein.

As shown in FIG. 4, an anti-reverse mechanism 50 of the rotor 3 is disposed in the cylindrical portion 30 of the rotor 3. The anti-reverse mechanism 50 has a roller-type one-way clutch 51 and an operating lever 52 for switching the one-way clutch 51 between an operating state and a non-operating state. The operating lever 52 is fitted pivotably on the main piece 2a, and by pivoting the operating lever 52, the one-way clutch 51 is switched between an operating state and a non-operating state. When the one-way clutch 51 is an operating state, the rotor 3 cannot rotate in reverse, whereas when the one-way clutch 51 is in a non-operating state, the rotor 3 can rotate in reverse. The anti-reverse mechanisms are conventional components that are well known in the art. Therefore, their structures will not be discussed or illustrated in detail herein.

As shown in FIGS. 1 and 2, the spool 4 is arranged between the first rotor arm 31 and the second rotor arm 32 of the rotor 3, and is fitted to the fore-end of the spool shaft 15 with a drag mechanism (not shown) interposed between the spool 4 and the spool shaft 15. The spool 4 includes a bobbin trunk portion 4a circumferentially around which fishing line is wound, a skirt portion 4b formed integrally with a rear portion of the bobbin trunk portion 4a, and a front flange portion 4c fastened to the front of the bobbin trunk portion 4a.

As shown in FIGS. 2, 4, and 5, the rotor drive mechanism 5 includes a master gear 11 that is a face gear rotating together with a master gear shaft 10 to which the handle 1 is fixedly coupled, and the pinion gear 12 that meshes with the master gear 11. The rotor drive mechanisms are conventional components that are well known in the art. Therefore, their structures will not be discussed or illustrated in detail herein.

The oscillating mechanism 6 is a reduction-gear type oscillating mechanism, and as shown in FIGS. 2 and 4 to 8, it is furnished with a drive gear 10a formed on the master gear shaft 10 formed integrally with the master gear 11, a stepped gear 13, and a shifting mechanism 17. The shifting mechanism 17 has a driven gear 16 and a slider 22 arranged so as to face the driven gear 16.

The stepped gear 13 and the driven gear 16 are supported rotatably inside of the rear side wall of the main piece 2a, as shown in FIGS. 4 and 5. The rotating axes of the stepped gear 13 and the driven gear 16 are arranged parallel to the rotating axis of the master gear shaft 10.

The stepped gear 13 has, as shown in FIGS. 4 and 5, a larger-diameter gear portion 19 that meshes with the drive gear 10a, and a smaller-diameter gear portion 20 that is arranged coaxially with the larger-diameter gear portion 19 and meshes with the driven, gear 16. The smaller-diameter gear portion 20 is formed integrally with the larger-diameter gear portion 19 and rotates together with the larger-diameter gear portion 19.

Figure 6:
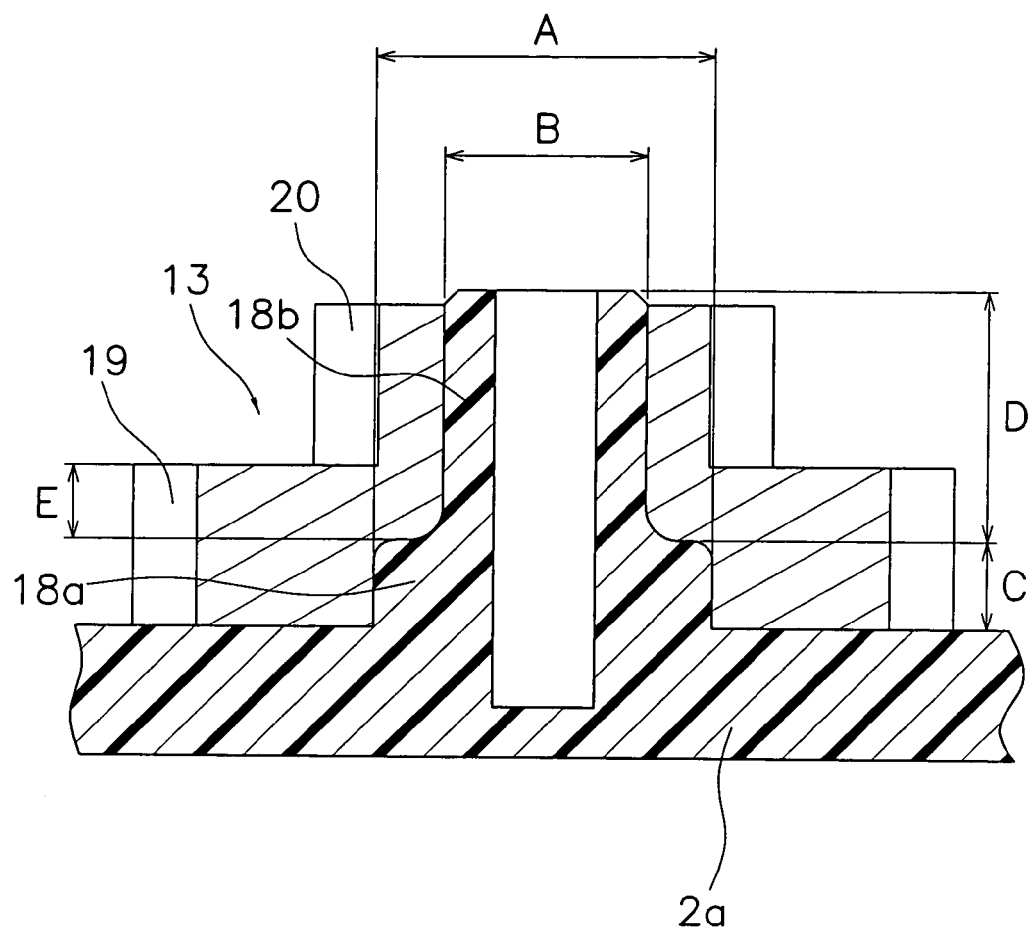
FIG. 6 is an enlarged cross-sectional view of a stepped gear in accordance with the embodiment of the present invention.

The larger-diameter gear portion 19 and the smaller-diameter gear portion 20 are, as shown enlarged in FIG. 6, fitted rotatably onto a larger-diameter gear shaft 18a formed so as to protrude from the inside of the rear side wall of the main piece 2a, and onto a smaller-diameter gear shaft 18b formed integrally with the fore-end of the larger-diameter gear shaft 18a. The diameter B of the smaller-diameter gear shaft 18b is smaller than the diameter A of the larger-diameter gear shaft 18a. The shaft-wise length C of the larger-diameter gear shaft 18a is shorter than the shaft-wise length D of the smaller-diameter gear shaft 18b. The larger-diameter gear portion 19 is fitted to the entirety of the larger-diameter gear shaft 18a and a portion of the smaller-diameter gear shaft 18b up to the length E. In this way, fitting the smaller-diameter gear portion 20 to the part of the smaller-diameter gear shaft 18b excluding the length E allows the bottom face of the smaller-diameter gear portion 20 to be extended axially outward by the length E. This consequently ensures a sufficient root circle diameter for the smaller-diameter gear portion 20, and therefore, the strength of the smaller-diameter gear portion 20 can be kept high.

Figure 7:
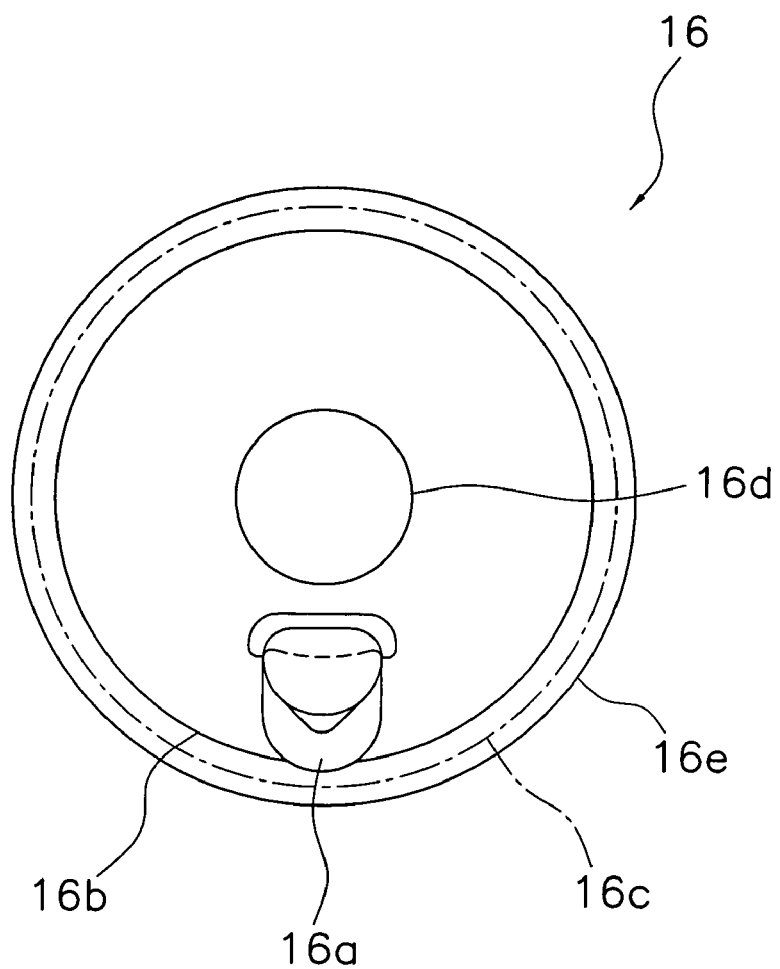
FIG. 7 is an enlarged plan view of a driven gear in accordance with the embodiment of the present invention.
Figure 8:
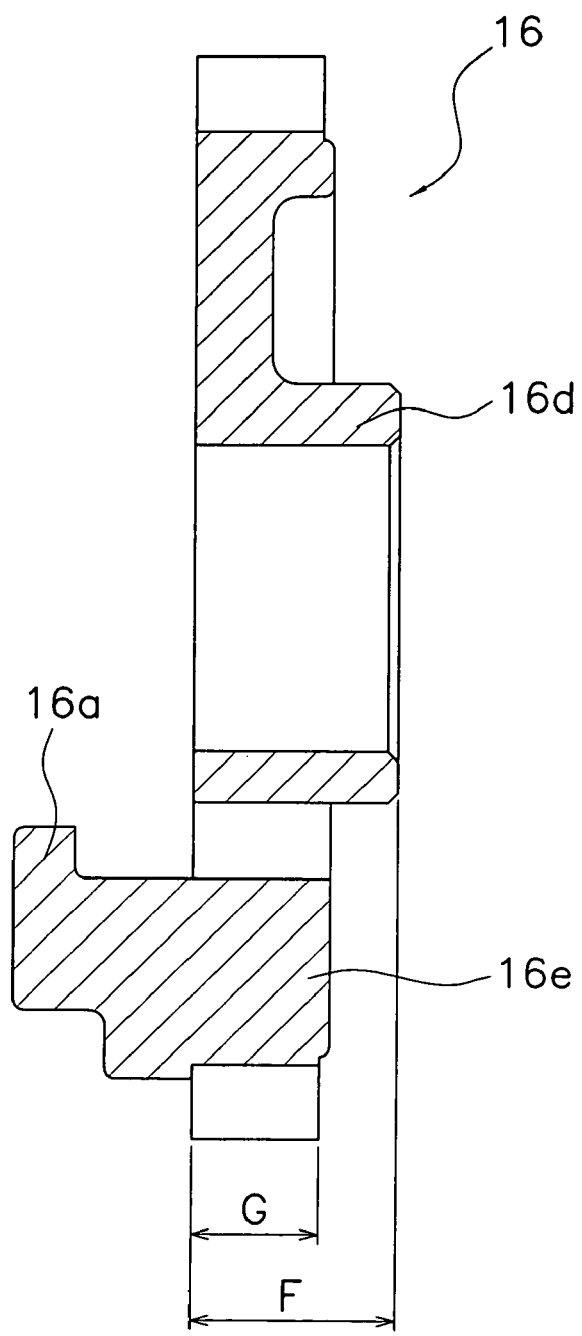
FIG. 8 is an enlarged cross-sectional view of the driven gear in accordance with the embodiment of the present invention.

As shown enlarged in FIGS. 7 and 8, the driven gear 16 includes a boss portion 16d having a hole formed at the center of the driven gear 16 for supporting the shaft, a body portion 16e provided on the outer periphery of the boss portion 16d and having a plurality of teeth on its outer peripheral edge, and a cam pin 16a which is separately provided and protrudes toward the slider 22. The cam pin 16a is crimp-fastened onto a side face of the driven gear 16. The fore end of the cam pin 16a is, as shown in FIG. 7, arranged so as to protrude outward in the radial direction further than the root circle 16b, so that the slide stroke can be lengthened while the gear diameter 16c can be maintained. As shown in FIG. 8, the shaft-wise length F of the boss portion 16d is longer than the shaft-wise length G (the tooth width of the driven gear 16) of the body portion 16e.

The slider 22 is supported so as to be shiftable back and forth in the main piece 2a. The slider 22 is coupled with the rear end of the spool shaft 15 non-rotatably and immovably in the axis direction. A vertically-extending cam groove 22a is formed on the side face of the slider 22 that opposes the driven gear 16. The cam pin 16a is engaged with this cam groove 22a. The length of the cam groove 22a is slightly longer than the rotational diameter of the cam pin 16a.

In the reduction-gear type oscillating mechanism 6 with such a configuration, when the master gear shaft 10 rotates, the driven gear 16 is rotated via the stepped gear 13, thereby rotating the cam pin 16a. The rotation of the cam pin 16a then shifts the slider 22 engaged with the cam groove 22a back and forth, accordingly pumping the spool 4 back and forth. The oscillating mechanisms are conventional components that are well known in the art. Therefore, their structures will not be discussed or illustrated in detail herein.

In the spinning reel thus configured, the joint S between the main piece 2a and the lid member 2b forms, where exposed sideways, a curved seam along the rod-attachment leg 36 side, and therefore, a wasteful space between the joint S of the main piece 2a and the contour of the reel is eliminated. Eliminating such a wasteful space thus makes it possible to reduce the overall size of the reel and yet to keep the strength of the reel unit 2 high.

Moreover, since the joint S is formed to shape a curved line herein, the contact area between the main piece 2a and the lid member 2b increases, improving the durability under a load. Also, because the joint S is formed to shape a curved line in the present embodiment, the decrease in the cross-sectional area of the joint S is gradual. Therefore, the strength of the reel unit 2 can be made further higher.

Other Embodiments (a) The type of the spinning reel is not limited to the foregoing embodiment. The present invention can also be applied to spinning reels having a drag mechanism and those in which a brake mechanism has a brake lever in place of the anti-reverse mechanism.

(b) Although a reduction-gear type oscillating mechanism 6 is adopted in the foregoing embodiment, a traverse cam type oscillating mechanism may be employed.

(c) In the foregoing embodiment, the lid member 2b is formed integrally with the rod-attachment leg portion 36 as a one-piece unitary unit, but the main piece 2a may be formed integrally with the rod-attachment leg portion 36 as a one-piece unitary unit.

(d) Although in the foregoing embodiment, the smaller-diameter gear portion 20 is formed integrally with the larger-diameter gear portion 19, they may be formed separately. In addition, the larger-diameter gear portion 19 may be fitted only to the larger-diameter gear shaft 18a, although it is fitted also to a portion of the smaller-diameter gear shaft 18b in the embodiment.

(e) In the foregoing embodiment, the main piece 2a is screw-fastened at its upper portion and lower portion with respective tapping screws 71 and 72 inserted through the lid member 2b, but it may be tapped at one or more locations excluding the peripheral edge portion of the main piece 2a. In addition, although the main piece 2a is screw-fastened at the rear of the main piece 2a with the screw 70 inserted through the main piece 2a, the location is not limited to the rear of the main piece 2a and may be a lower peripheral edge portion or the like of the main piece 2a.

(f) In the foregoing embodiment, the joint S between the main piece 2a and the lid member 2b forms a curved seam on the rod-attachment leg portion 36 side, so as to form a curve bulging downward and tilting upward toward the front, but it may be shaped to form any curved line.

According to the present invention, in the spinning-reel reel unit, the reed body is formed so that the joint between the main piece and the lid member that is exposed on the rod-attachment leg side shapes a curved line. Therefore, the overall size of the reel is reduced, and yet, the strength of the reel unit can be maintained high.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications Nos. 2003-020764, 2003-020765, and 2003-020766. The entire disclosure of Japanese Patent Applications Nos. 2003-020764, 2003-020765, and 2003-020766 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spinning-reel reel unit adapted to be mounted onto a fishing rod and from which fishing line can be reeled out frontward, the reel unit comprising:
    a rod-attachment leg portion adapted to be mounted onto the fishing rod; and
    a reel body at which the rod-attachment leg portion is arranged, including
        a main piece having a housing space and an opening through which the housing space is open, and
        a lid member detachably/reattachably fitted to the main piece so as to cover the opening in the main piece, the reel body being shaped so that a joint between the main piece and the lid member forms a curved seam on a side of the main piece closer to the rod-attachment leg portion, the joint being formed so as to bulge downward in a direction away from the rod-attachment leg portion.

2. The spinning-reel reel unit as set forth in claim 1, wherein
    the joint is tilted upward on the rod-attachment leg portion side toward a front side.

3. The spinning-reel reel unit as set forth in claim 1, wherein
    the rod-attachment leg portion is formed integrally with the main piece as a one-piece unitary unit.

4. The spinning-reel reel unit as set forth in claim 1, wherein
    the rod-attachment leg portion is formed integrally with the lid member as a one-piece unitary unit.

5. The spinning-reel reel unit as set forth in claim 1, wherein
    the lid member is made of a metal, and
    the lid member and the main piece are fastened with a screw at a peripheral edge portion of the main piece, the screw being inserted through the main piece.

6. The spinning-reel reel unit as set forth in claim 5, wherein
    the main piece is made of a synthetic resin, and
    the lid member and the main piece are fastened with a tapping screw at a portion of the main piece other than the peripheral edge portion, the tapping screw being inserted through the lid member.

7. The spinning-reel reel unit as set forth in claim 6, further comprising
    a cover member that covers at least one of the rod-attachment leg portion and the reel body from rear, so as to cover at least one of the screw and the tapping screw.

8. The spinning-reel reel unit as set forth in claim 1, wherein
    the main piece is formed in a rearwardly tapered shape.

9. The spinning-reel reel unit as set forth in claim 1, further comprising
    a cover member covering at least one of the rod-attachment leg portion and the reel body from rear.

10. A spinning reel adapted to be mounted onto a fishing rod, comprising:
    a handle;
    a reel unit which rotatably supports the handle, the reel unit including
        a rod-attachment leg portion adapted to be mounted onto the fishing rod; and
        a reel body at which the rod-attachment leg portion is arranged, including
            a main piece having a housing space and an opening through which the housing space is open, and
            a lid member detachably/reattachably fitted to the main piece so as to cover the opening in the main piece, the reel body being shaped so that a joint between the main piece and the lid member forms a curved seam on a side of the main piece closer to the rod-attachment leg portion, the joint being formed so as to bulge downward in a direction away from the rod-attachment leg portion;
    a rotor rotatably arranged at a front of the reel unit; and
    a spool arranged at a front of the rotor for winding fishing line around its outer peripheral surface.

11. The spinning reel as set forth in claim 10, wherein
the joint is tilted upward on the rod-attachment leg portion side toward a front side.

12. The spinning reel as set forth in claim 10, wherein
the rod-attachment leg portion is formed integrally with the main piece as a one-piece unitary unit.

13. The spinning reel as set forth in claim 10, wherein
the rod-attachment leg portion is formed integrally with the lid member as a one-piece unitary unit.

14. The spinning reel as set forth in claim 10, wherein
the lid member is made of a metal, and
the lid member and the main piece are fastened with a screw at a peripheral edge portion of the main piece, the screw being inserted through the main-piece.

15. The spinning reel as set forth in claim 14, wherein
the main piece is made of a synthetic resin, and
the lid member and the main piece are fastened with a tapping screw at a portion of the main piece other than a peripheral edge portion, the tapping screw being inserted through the lid-member.

16. The spinning reel as set forth in claim 15, further comprising
    a cover member that covers one of the rod-attachment leg portion and the reel body from rear, so as to cover at least one of the screw and the tapping screw.

17. The spinning reel as set forth in claim 10, wherein
the main piece is formed in a rearwardly tapered shape.

18. The spinning reel as set forth in claim 10, further comprising
    a cover member covering at least one of the rod-attachment leg portion and the reel body from rear.

* * * * *